US012596654B2

(12) United States Patent
Andrejczuk et al.

(10) Patent No.: US 12,596,654 B2
(45) Date of Patent: Apr. 7, 2026

(54) PROTECTION AGAINST TRANSLATION LOOKUP REQUEST FLOODING

(71) Applicant: Intel Corporation, Santa Clara, CA (US)

(72) Inventors: Grzegorz Andrejczuk, Warsaw (PL); Lukasz Odzioba, Gdansk (PL); Piotr Stankiewicz, Milanowek (PL); Lukasz Daniluk, Gdansk (PL); Michal Michalik, Poznan (PL); Bartosz Pawlowski, Gdansk (PL); Mariusz Zarnowski, Warsaw (PL); Aleksandra Barska, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 871 days.

(21) Appl. No.: 17/698,973

(22) Filed: Mar. 18, 2022

(65) Prior Publication Data

US 2022/0206954 A1     Jun. 30, 2022

(51) Int. Cl.
| | |
|---|---|
| *G06F 12/1027* | (2016.01) |
| *G06F 12/02* | (2006.01) |
| *G06F 12/0891* | (2016.01) |
| *G06F 13/16* | (2006.01) |
| *G06F 13/42* | (2006.01) |

(52) U.S. Cl.
CPC ...... *G06F 12/1027* (2013.01); *G06F 12/0238* (2013.01); *G06F 12/0891* (2013.01); *G06F 13/1668* (2013.01); *G06F 13/4221* (2013.01)

(58) Field of Classification Search
None
See application file for complete search history.

(56) References Cited

U.S. PATENT DOCUMENTS

| | | | | |
|---|---|---|---|---|
| 10,747,679 | B1 * | 8/2020 | Larson | G06F 12/1027 |
| 2002/0073282 | A1 * | 6/2002 | Chauvel | G06F 12/0292 |
| | | | | 712/E9.033 |
| 2007/0050594 | A1 * | 3/2007 | Augsburg | G06F 12/126 |
| | | | | 711/E12.075 |
| 2018/0004664 | A1 * | 1/2018 | Craddock | G06F 12/1027 |
| 2020/0371953 | A1 | 11/2020 | Guo et al. | |

OTHER PUBLICATIONS

AMD, "AMD64 Technology Platform Quality of Service Extensions", Advanced Micro Devices, Publication # 56375, Revision: 1.02, Oct. 2020, 20 pages.

(Continued)

*Primary Examiner* — Charles J Choi
(74) *Attorney, Agent, or Firm* — Compass IP Law PC

(57) ABSTRACT

Examples described herein relate to circuitry to permit evictions of entries from a Translation Lookaside Buffer (TLB) by one or more functions or hosts and limit evictions of entries from the TLB by one or more other functions or hosts. Limiting evictions of entries from the TLB by one or more other functions or hosts can be based on a number of TLB entry evictions from the TLB over an amount of time. Limiting evictions of entries from the TLB by one or more other functions or hosts can occur by reducing a number of indices available to the one or more functions or hosts.

17 Claims, 10 Drawing Sheets

(56) References Cited

OTHER PUBLICATIONS

Bechtel, Michael and Yun, Heechul, "Memory-Aware Denial-of-Service Attacks on Shared Cache in Multicore Real-Time Systems", University of Kansas, USA, v2, Jan. 15, 2020, 8 pages.

Di, Bang et al., "TLB-pilot: Mitigating TLB Contention Attack on GPUs with Microarchitecture-Aware Scheduling", ACM Trans. Archit. Code Optim., vol. 19, No. 1, Article 9, Publication date: Dec. 2021, 23 pages.

Qiu, Haoran et al., "SLO beyond the Hardware Isolation Limits", Sep. 23, 2021, 7 pages.

* cited by examiner

TLB entries

Allowed entries (PF1 to PF4)

PCIe function 1

PCIe function 2

PCIe function 3

PCIe function 4

FIG. 3

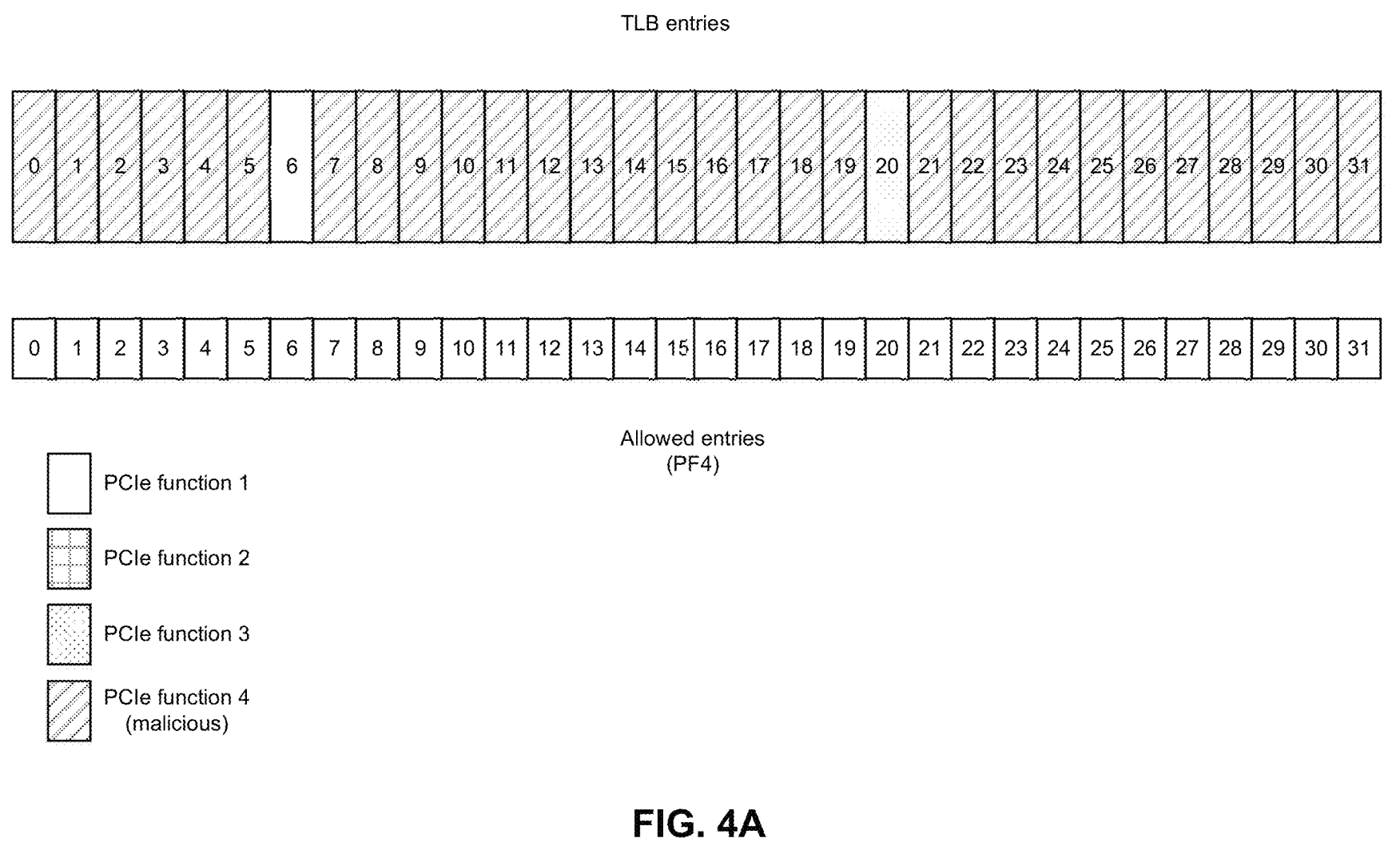

TLB entries

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |

Allowed entries
(PF4)

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |

PCIe function 1

PCIe function 2

PCIe function 3

PCIe function 4
(malicious)

FIG. 4A

TLB entries

Allowed entries (PF4)

PCIe function 1

PCIe function 2

PCIe function 3

PCIe function 4 (malicious)

FIG. 4B

TLB entries

Allowed entries (PF4)

PCIe function 1

PCIe function 2

PCIe function 3

PCIe function 4 (malicious)

PROTECTION AGAINST TRANSLATION LOOKUP REQUEST FLOODING

Devices, such as network interface devices, provide communications among host devices. A single network interface device can support multiple hosts via device interfaces. An example device interface is a Peripheral Component Interconnect express (PCIe) interface. Peripheral Component Interconnect Express (PCIe) specification v5.0 (2019) defines a distributed translation system, where devices utilize an Address Translation Cache (ATC) to store address translations. The PCIe specification defines an Address Translation Service (ATS) protocol for ATC to synchronize the ATC with a Translation Agent's (TA) central translation database. ATS is a PCIe feature to translate a virtual address to a physical address before the network interface device accesses host memory with virtual addresses.

BRIEF DESCRIPTION OF THE DRAWINGS

FIG. 3 depicts an example of TLB indices in a TLB cache and associated functions.

FIGS. 4A-4C depict an example of change of states of allowed indices before and after a malicious attack is detected.

DETAILED DESCRIPTION

A Translation Lookaside Buffer (TLB) can be used to store translations of a virtual address to a physical address. An attack vector can arise where a host-executed process performs remapping of address translations in an address translation cache (e.g., the ATC and/or TLB) or additions of address translations into the address translation cache. As the address translation cache is shared among multiple hosts and host-executed processes, addition of new entries can cause eviction of entries, from the address translation cache, associated with other processes. Evictions of entries from an address translation cache can increase latency for memory read or write operations by causing the host memory management unit (MMU) or input output MMU (IOMMU) to perform a time-consuming page walk process to retrieve a virtual address to physical address translation from a chain of page table entries (PTEs) and thereby increase a time to complete a workload of a process. When the address translation cache evicts translations for other PCIe functions, translations requested from host MMU can increase markedly, which can lead to excessive PCIe traffic and denial of service (DoS) of address translations. DoS of address translations can occur by flooding an MMU with requests for address translations, which can bottleneck the system and delay address translations being completed for processes and PCIe functions (e.g., virtual functions (VFs)) that do not have address translations stored in the address translation cache. A malicious process can generate address translation requests to negatively affect performance of the other PCIe functions, possibly attached to different virtual machines (VMs) and even separate hosts in a multi-host scenario.

To at least potentially provide protection against DoS attacks at an MMU from requests for address translations, for single or multiple connected hosts, a device can detect potential attacks by counting a number of evictions, reads, and/or writes (stores) associated with particular requesters such as PCIe functions. When a certain level of evictions, reads, and/or writes (stores) is reached by a requester, the accessible TLB indices available to a requester can be reduced. Accordingly, an MMU can detect a DoS attack and limit number of evictions, reads, and/or writes (stores) based on a level of TLB thrashing or level of changes to entries in a TLB.

Figure 1A:
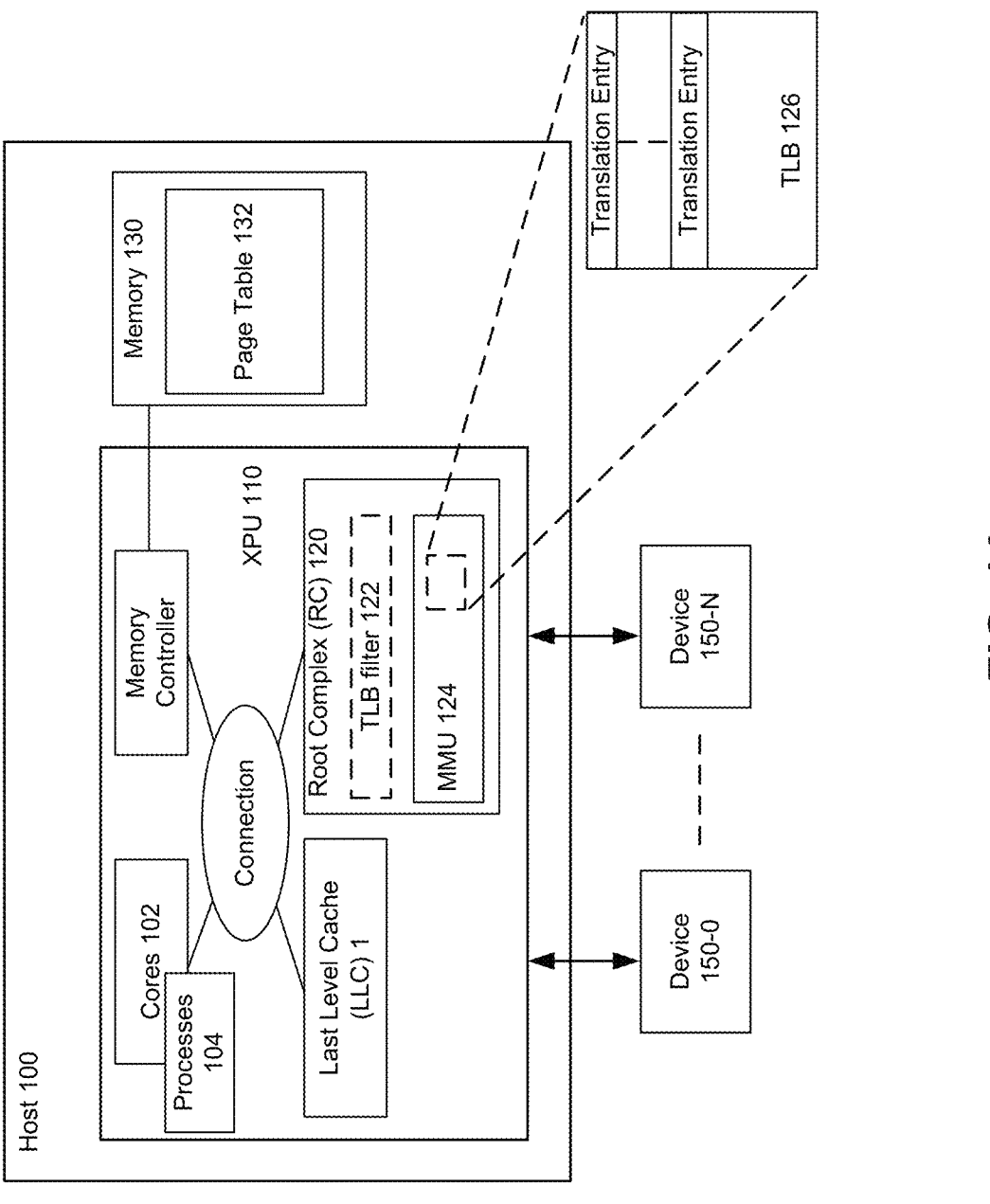
FIG. 1A depicts an example system.

FIG. 1A depicts an example system. Various examples of host 100 can include elements described at least with respect to FIGS. 6 and 7. One or more cores 102 of XPU 110 can execute one or more processes 104. Processes 104 can also include one or more of: a virtual machine (VM), application, container, microservice, thread, and/or function. Processes 104 can utilize one or more of devices 150-0 to 150-N, where N≥1. For example, one or more of devices 150-0 to 150-N can be coupled to XPU 110 via one or more device interfaces such as PCIe (e.g., PCI Express Base Specification, revision 4.0, version 1.0, published Oct. 5, 2017 (or earlier or later revision or derivatives thereof)) or Compute Express Link (CXL) as well as using virtualized interfaces such as Single Root I/O Virtualization (SR-IOV) and Sharing specification, version 1.1, published Jan. 20, 2010 by the Peripheral Component Interconnect (PCI) Special Interest Group (PCI-SIG) or Scalable Input/Output (I/O) Virtualization (S-IOV) (2018) (or earlier or later revision or derivatives thereof). In some examples, one or more of processes 104 can utilize one or more of devices 150-0 to 150-N as a PCIe function. A PCIe function can be defined by a function ID (FID). A PCIe function can specify a function type and a physical channel identifier PCHID.

Root complex (RC) 120 can provide a trusted and secure circuitry that generates transaction requests on behalf of one or more cores 102. In some examples, RC 120 can include or access MMU 124. MMU software (e.g., operating system (OS) and MMU subsystem) and MMU 124 can translate a virtual address to a physical addresses at the request of a device 150 and/or one or more of processes 104. In a virtualized environment, Address Translation Service (ATS) allows an endpoint to communicate with RC 120 in order to maintain a translation cache in TLB 126. Device 150 can request that a translation of a virtual to physical address be provided to a device 150. A virtual address can include a memory mapped virtual address or input/output (I/O) virtual address. MMU 124 can include or access TLB 126 and TLB 126 can include one or more translations of virtual to physical addresses retrieved from page table 132. TLB 126 can store translations requested from host MMU 124, where a translation can be composed from a requester identifier (ID), host address and device address. The translation can be stored in TLB 126 and due to the cache size limitation, index mapping data to proper cache cell can occur using a TLB index and based on a hash computation.

A tag can include less bits (e.g., 14 bits) compared to a Bus:Device.Function (BDF) and two 64 bit addresses that include 144 bits per entry when devices can address up to 57 bits. Accordingly, 144 bit indices can be mapped to a single 14 bit tag. An eviction can occur when an entry is replaced by another entry or the entry is marked as being overwritable. An invalidation can occur when an entry is deleted or cleared. When a translation in TLB 126 is evicted or invalidated, a next request for a translation will miss and trigger a PCIe request to obtain the translation from page table 132. TLB 126 performance can decrease as a number of evictions and/or invalidations rises. TLB 126 can be shared among one or more of hosts and devices 150-0 to 150-N. Performance of processes executed by a host can be slowed based on evictions and/or invalidations of address translations rising in TLB 126.

Device 150-0 to 150-N can store one or more virtual-to-physical address translations in an address translation cache (ATC) (not shown). The translations can be available to read data from memory 130 or write data to memory 130. Various examples of devices 150-0 to 150-N include one or more of: a network interface device, storage device, memory device, memory pool with dual inline memory modules (DIMMs), accelerator, graphic processing unit cards, audio or sound processor cards, and so forth.

In some examples, TLB access filter 122 can detect an over-utilization of page table 132 and limit evictions from TLB 126 and/or invalidations of entries in TLB 126 based on a level of TLB thrashing or number of TLB entry evictions and/or invalidations. TLB access filter 122 can be part of an ATS system or MMU 124, in some examples. Note that reference to evictions can refer to evictions, evictions and invalidations, or merely invalidations. TLB access filter 122 can count a number of evictions caused by one or more PCIe functions or one or more hosts in a multi-host environment. TLB access filter 122 can count a number of evictions caused by one or more of the sources such as a PCIe function, host in a multi-host scenario, or process address space identifiers (PASIDs). TLB access filter 122 can count a number of evictions caused by one or more of the sources. Counter can be increased when a function or host evicts another function's or host's TLB entry. The counter can be decreased when a function's or host's TLB entry is evicted by another function or host. If the PCIe function exceeds a thrashing threshold, TLB access filter 122 can limit the cache entries allowed to be stored in TLB 126 by clearing one or more bits in an allowed index or indices mask. As numbers of evictions increase beyond the thrashing threshold, a single allowed cache index for this PCIe function can be available for use in TLB 126. TLB access filter 122 can reduce or disable ability for a malicious function or host to evict entries and allow entries of the malicious function or host to be evicted from TLB 126. As described herein, masking of one or more bits of an index can decrease available indexes associated with entries that can be evicted. Bits can be masked in any order or direction.

Limiting ability of a function or host to evict entries in a TLB can isolate a noisy neighbor from affecting TLB usage by other neighbors (e.g., functions or hosts). In some examples, a function or host may not be limited from evicting entries from a TLB whereas other functions or hosts may be limited from evicting entries from the TLB. A service level agreement (SLA) associated with a function or host can indicate whether a number of evictions can be limited for the function or host. If the SLA allows a function or host to evict entries from the TLB without bound, the mask can be set to all 1s or a value that allows eviction of entries from the TLB and does not restrict access to the TLB. The SLA can set a frequency of evictions that a function or host is permitted to make before being bounded by use of a mask. If the SLA does not specify whether or not limits of evictions for a function or host are permitted, limits on evictions can be performed as described herein.

TLB access filter 122 can be implemented as one or more of: programmable general-purpose or special-purpose microprocessors, processor-executed software, field programmable gate arrays (FPGAs), digital signal processors (DSPs), programmable controllers, application specific integrated circuits (ASICs), programmable logic devices (PLDs), or the like, or a combination of such devices.

In some examples, Intel® Resource Director Technology (RDT) can be configured to perform operations of TLB access filter 122 to limit TLB usage. Intel® RDT can allocate shared hardware resources such as Last Level Cache (LLC), memory bandwidth, and other hardware resources to applications. AMD64 Technology Platform Quality of Service Extensions, revision 1.02 (2020), ARM, and other technologies can perform operations of TLB access filter 122 to limit TLB usage.

Figure 1B:
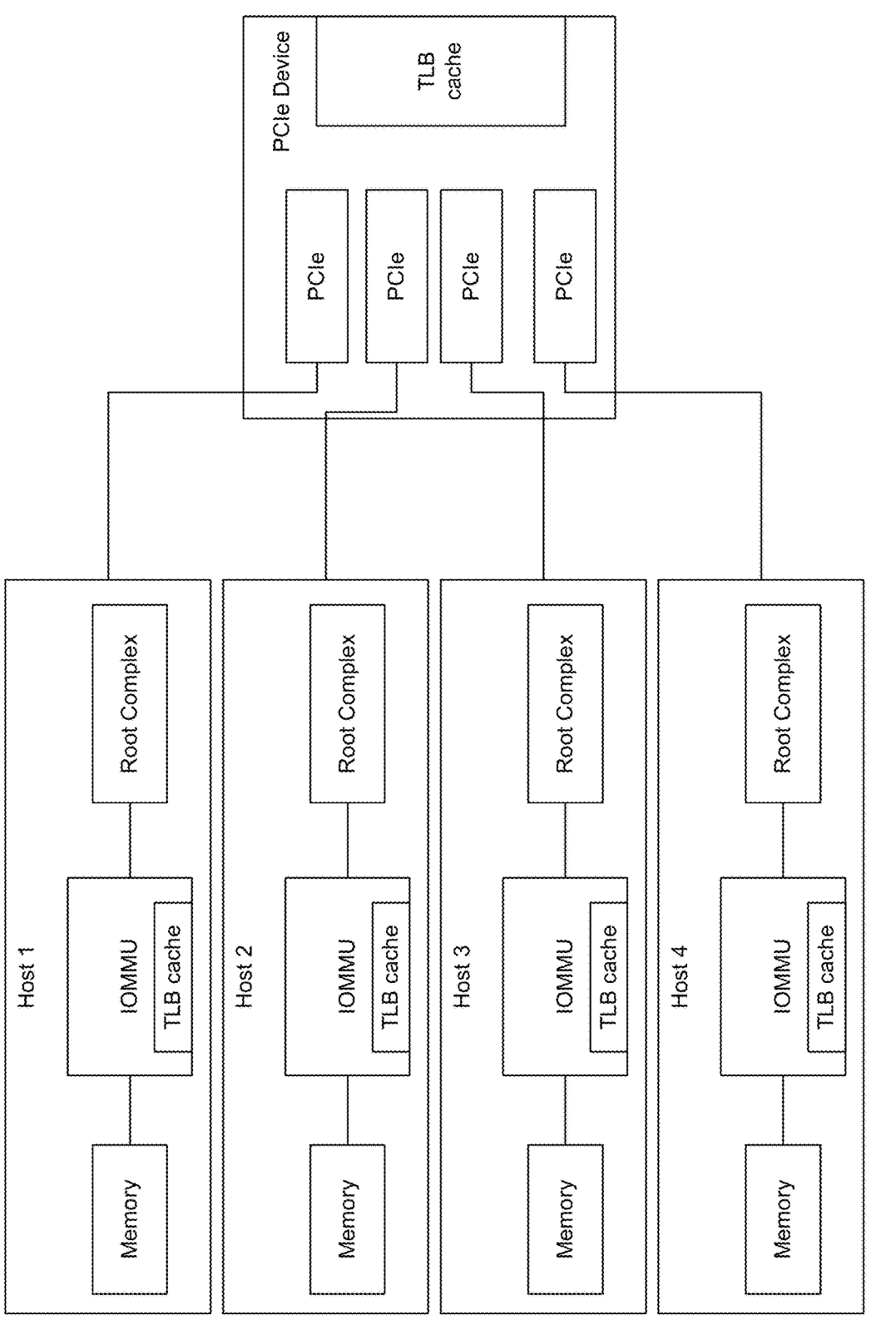
FIG. 1B depicts an example system that depicts multiple hosts accessing a single device.

FIG. 1B depicts an example system that depicts multiple hosts accessing a single PCIe device. As multiple hosts access a single PCIe device, even one host (or VM executing thereon) being compromised to increase TLB lookups can lead to potential slowdown of other hosts (or VMs executing thereon). An IOMMU associated with one or more hosts can utilize TLB access filter 122 to potentially reduce a number of entry evictions as described herein. Although examples herein are described with respect to PCIe, device interfaces other than PCIe can be used, such as CXL, or Double Data Rate (DDR) standards from by Joint Electronic Device Engineering Council (JEDEC).

Figure 2:
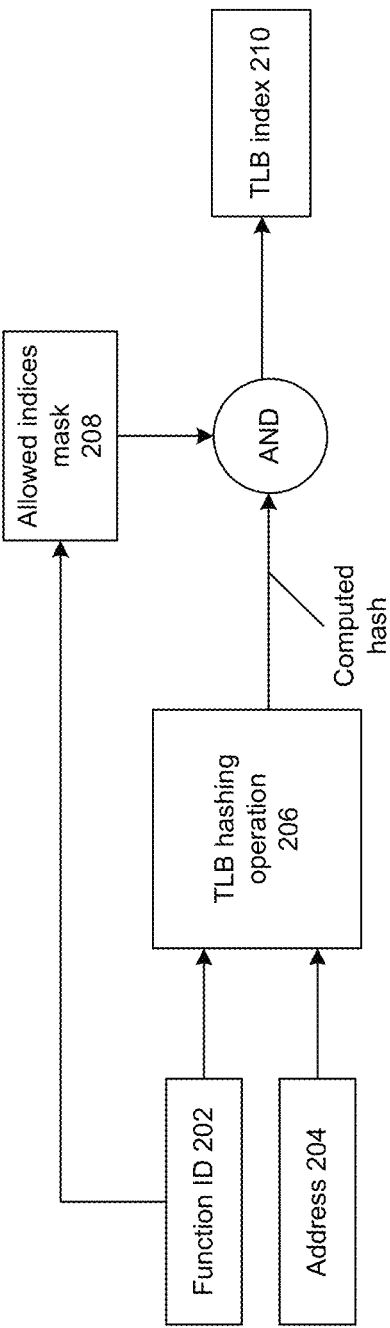
FIG. 2 depicts an example operation of a translation lookaside buffer (TLB) index filter.

FIG. 2 depicts an example operation of a TLB index filter. TLB index filter can configure allowed indices mask 208 to specify which entries can be evicted for a particular PCIe function ID (or host ID) 202. For a requested translation of address 204 associated with a function ID 202, hashing operation 206 can generate a computed hash value. The computed hash value can be ANDd with mask 208 to identify a TLB index that can be utilized to access an address translation. A logical AND of mask 208 with a computed hash function output can limit (or not limit) a TLB index that can be utilized to access an address translation or not. One or more bits in mask 208 can be logical ANDd with the calculated address to limit possible cache entry locations which can be used for function ID 202 and address 204 and generates TLB index 210.

A mask can be associated with a function, so that different functions can have different associated masks, and outputs of a functions can be impacted by masks independent from one another. If a most significant bit (MSB) is masked for outputs from two functions, both can use a lower part of available TLB indices making them share or compete for TLB entries. Functions that are not masked can access an entire TLB except that for half of the TLB indices, competition occurs for entries with functions with MSB masked. If a MSB is masked for a first function and an LSB is masked for a second function, a lower part of the TLB indices are available after masking the output of the first function, whereas even numbered TLB indices are available after masking the output of the second function.

For example, for 64 indices in a TLB, a TLB index of 6 bits can be used to address all of the 64 indices. A computed hashing function output is 6 bits, and can correspond to a TLB index that identifies a TLB entry. In an example, for a binary output of hashing operation 206 of 011101b (value 29) and a mask 208 of 111111b, a logical AND does not change an output of the hashing operation 206 so that a computed hash can represent TLB index 210. Where mask 208 is 111110b, due to limiting a number of lookup operations, a least significant bit (LSB)) of the binary output is changed to zero and TLB index 210 is 011100b (value 28). By setting a LSB of mask 208 to zero, odd TLB indices are unavailable for a function.

Figure 3:
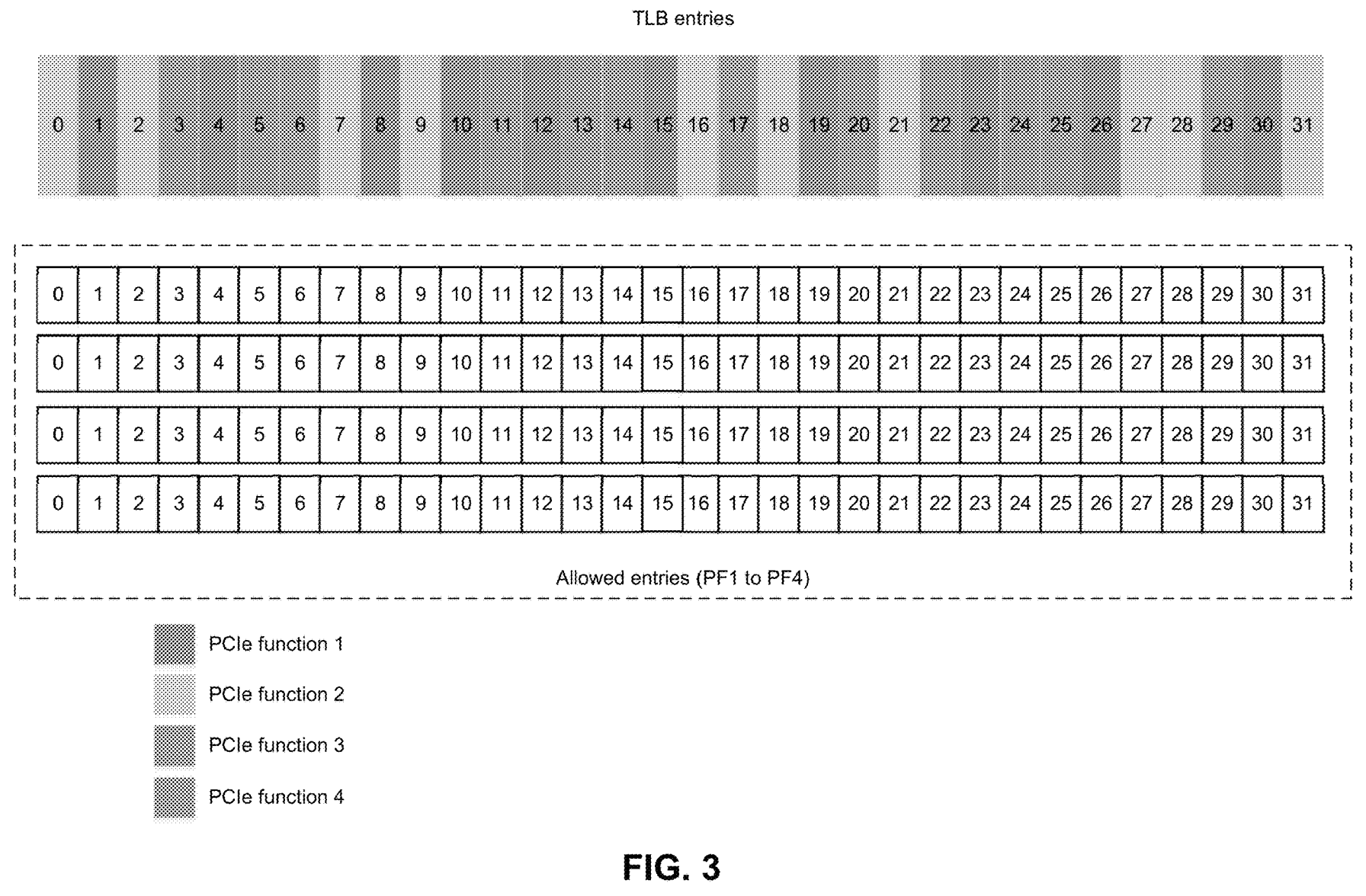

FIG. 3 depicts an example of TLB indices in a TLB cache and associated PCIe functions. Allowed indices can indicate which entry in a TLB can be allocated for use by a PCIe function. In this example, indices for PCIe functions 1-4 can be stored in any TLB entry slot in the TLB. The scenario can represent an initial state prior to detection of a potentially malicious DoS attack to overload use a TLB.

Figure 4B:
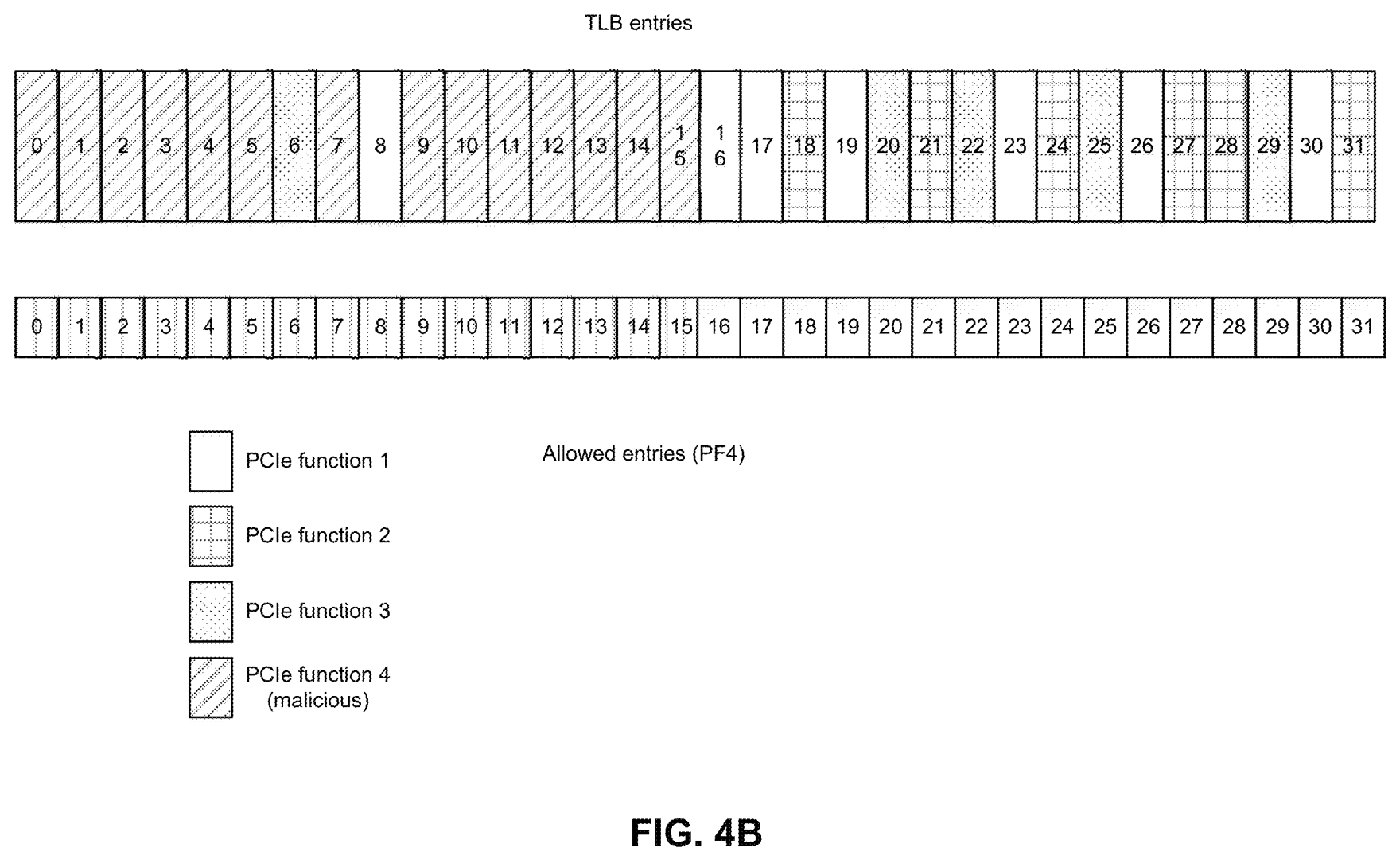
Figure 4C:
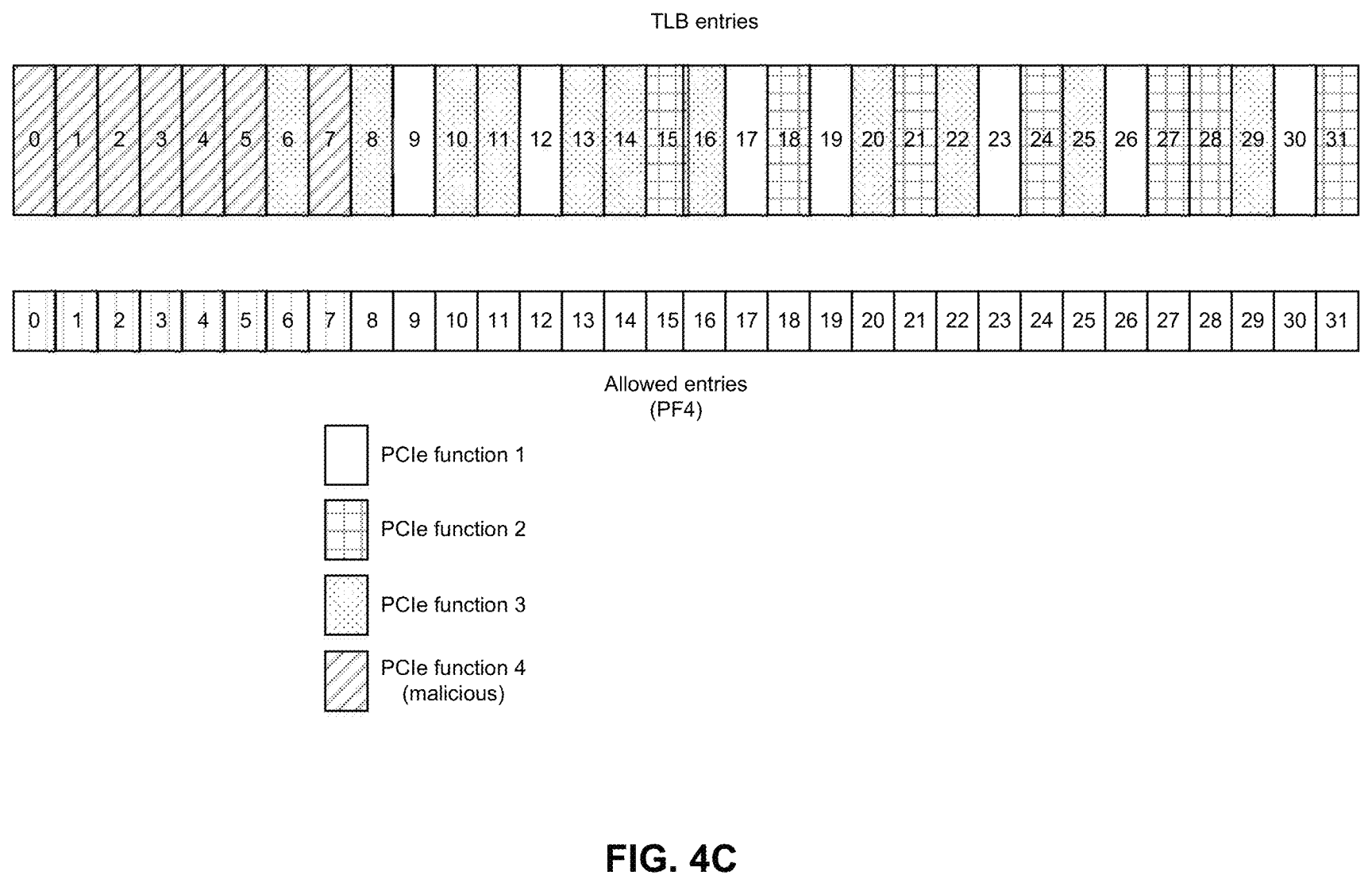

FIGS. 4A-4C depict an example of change of states of allowed indices before and after a malicious attack is detected. In FIG. 4A, PCIe function 4 (PF4) utilizes indices 0-5, 7, 9-19, and 21-31 of a 32 entry TLB. Allowed indices mask for PF4 allow translations for PF4 to be stored in any TLB entry slot in the TLB. In this scenario, TLB access filter has not detected that a number of evictions caused by PF4 exceeds a threshold.

FIG. 4B depicts a scenario where TLB access filter has detected that a number of evictions caused by PF4 exceeds a threshold. TLB access filter changes allowed indices mask for PF4 allow translations for PF4 in TLB to be reduced by half (e.g., indices 0-15), although other manners of reducing a number of allowed entries can be used (e.g., subtraction, division by other values greater than two, and so forth). For example, indices 0-15 are permitted to store entries for PF4 but indices 16-31 are not permitted to store entries for PF4. PF1-PF3 can cause eviction of entries associated with PF4 in indices 16-31.

FIG. 4C depicts a scenario where TLB access filter has detected that a number of evictions attempted by PF4 exceeds a second threshold, which is higher than the threshold. TLB access filter changes allowed indices mask for PF4 allow translations for PF4 in TLB to be reduced by half again, although other manners of reducing a number of allowed entries can be used (e.g., subtraction, division by other values greater than two, and so forth). For example, indices 0-7 are permitted to store entries for PF4 but indices 8-31 are not permitted to store entries for PF4. PF1-PF3 can cause eviction of entries associated with PF4 in indices 8-31. Should PF4 continue to request more evictions that evict third, fourth, and fifth threshold levels of increasing values, TLB access filter changes allowed indices mask for PF4 allow translations for PF4 in TLB to be reduced by half until merely one index (or potentially zero indices) in the TLB is permitted to be used by PF4.

Figure 5:
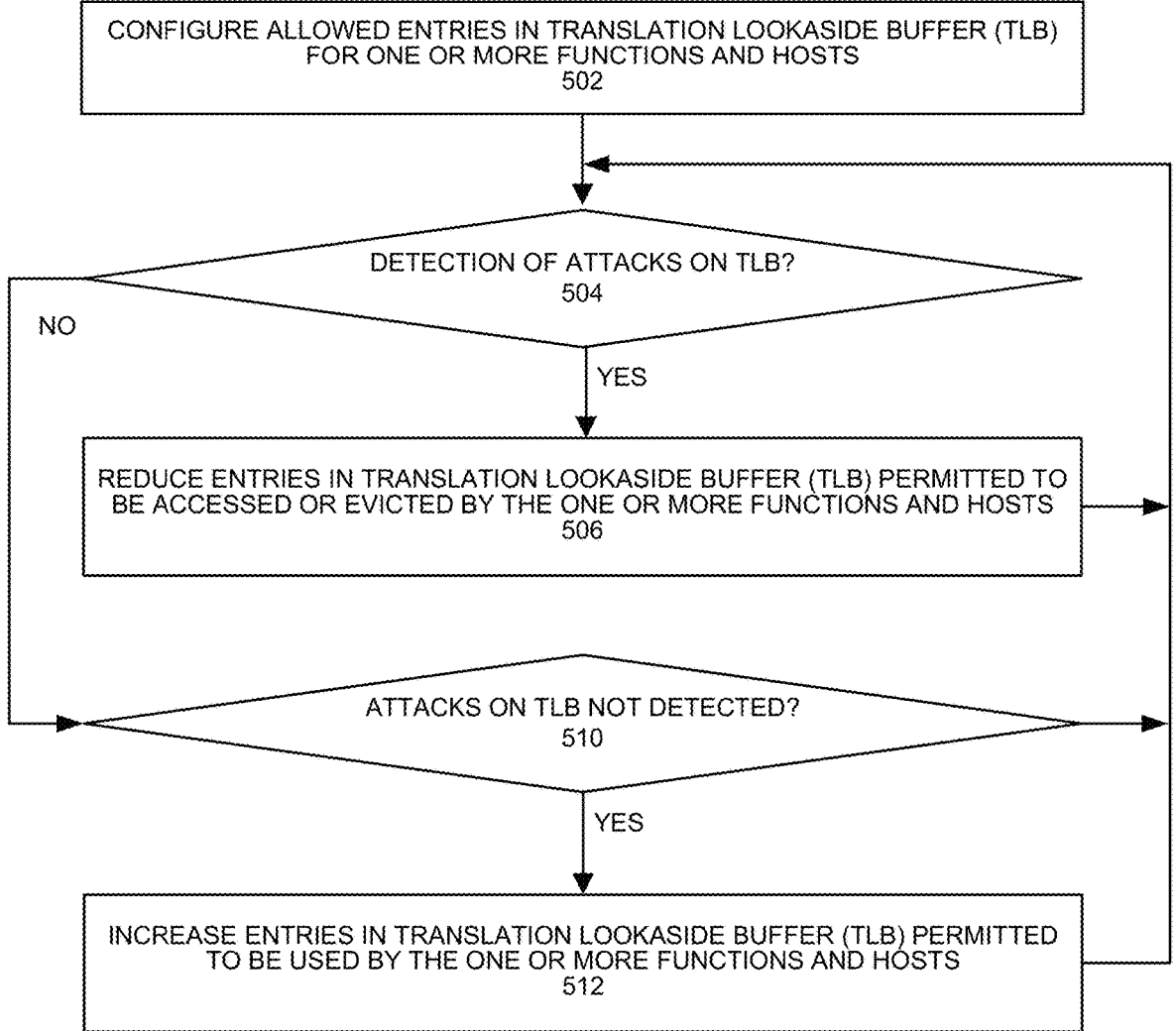
FIG. 5 depicts an example process.

FIG. 5 depicts an example process. The process can be performed by a memory management unit, ATS, or other circuitry. At 502, a bitmask of indices in a TLB permitted to store address translations for a particular function or host can be initialized. The bitmask can be initialized to permit the particular function or host to evict or store an address translation among a range of TLB indices. In some examples, the range is a full range of TLB indices, without restriction, although there may be a limited range of TLB indices that is less than the full range. At 504, a determination can be made if an attack on a TLB or overutilization of the TLB is detected. For example, if a number of evictions requested by a particular function or host over a period of time exceeds a first threshold, a TLB attack can be detected. The first threshold can apply to one or more of: number of evictions from a TLB performed or requested by a particular function or host over a period of time, number of stores to a TLB performed or requested by a particular function or host over a period of time, or number of reads from a TLB performed or requested by a particular function or host over a period of time. Based on detection of an attack, the process can continue to 506. Based on not detecting an attack, the process can continue to 510.

At 506, the bitmask can be adjusted to reduce a number of permitted TLB indices the particular function or host can store an address translation in the TLB or evict an address translation in the TLB. After 506, the process can continue to 504, but with an increased applied threshold level. At a subsequent performance of 504, should the increased threshold level be met or exceeded, the process can continue to 506, where a number of permitted TLB indices the particular function or host can evict, store-to, and/or read-from an address translation in the TLB can be reduced further. The threshold can be increased until a number of permitted TLB indices the particular function or host can evict, store-to, and/or read-from is reduced to one or zero.

At 510, a determination can be made if no overutilization or attack on a TLB is detected or a previously detected overutilization or attack has abated. For example, if a number of evictions over a period of time is less than the threshold or is decreasing, no overutilization or attack can be detected or a previously detected overutilization or attack can be determined to have abated. Based on no detection of overutilization or an attack or a previously detected overutilization or attack determined to have abated, the process can continue to 512. Otherwise, the process can continue to 504, where the threshold level can be set to the first threshold.

At 512, the number of permitted TLB indices the particular function or host can evict, store-to, and/or read-from an address translation in the TLB can be increased. The extent of increase can be additive or multiplicative, or restore the range of permitted entries the particular function or host can evict, store-to, and/or read-from an address translation in the TLB to its level set at 502.

Figure 6:
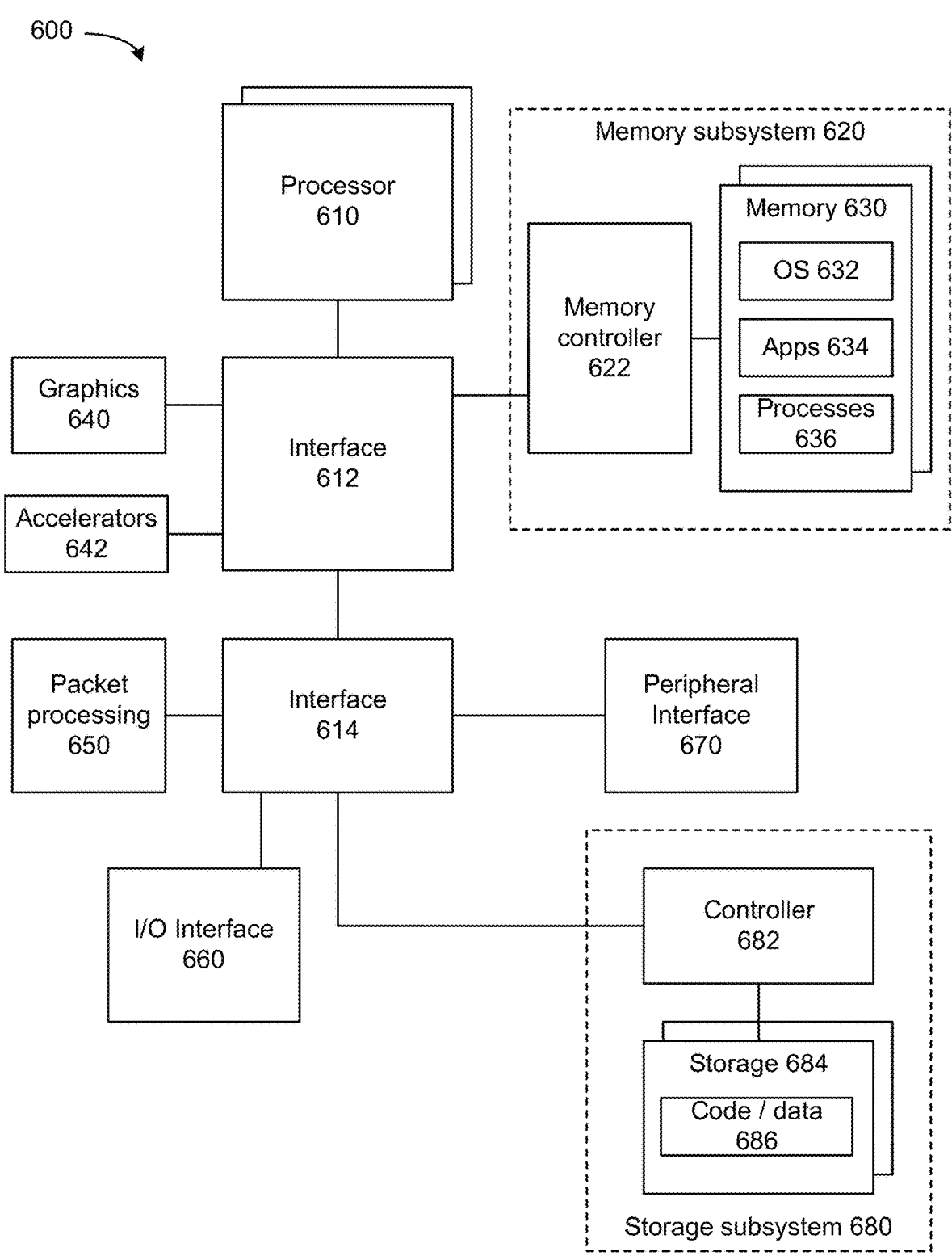
FIG. 6 depicts an example system.

FIG. 6 depicts a system. The system can use examples described herein to detect and reduce address translation evictions by malicious or a function or host that excessively requests address translation evictions, address translation stores, or address translation reads, as described herein. In some examples, a memory pool can include components of the system 600. System 600 includes processor 610, which provides processing, operation management, and execution of instructions for system 600. Processor 610 can include any type of microprocessor, central processing unit (CPU), graphics processing unit (GPU), XPU, processing core, or other processing hardware to provide processing for system 600, or a combination of processors. An XPU can include one or more of: a CPU, a graphics processing unit (GPU), general purpose GPU (GPGPU), and/or other processing units (e.g., accelerators or programmable or fixed function FPGAs). Processor 610 controls the overall operation of system 600, and can be or include, one or more program-mable general-purpose or special-purpose microprocessors, digital signal processors (DSPs), programmable controllers, application specific integrated circuits (ASICs), program-mable logic devices (PLDs), or the like, or a combination of such devices.

In one example, system 600 includes interface 612 coupled to processor 610, which can represent a higher speed interface or a high throughput interface for system components that needs higher bandwidth connections, such as memory subsystem 620 or graphics interface components 640, or accelerators 642. Interface 612 represents an interface circuit, which can be a standalone component or integrated onto a processor die. Where present, graphics interface 640 interfaces to graphics components for provid-ing a visual display to a user of system 600. In one example, graphics interface 640 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 640 generates a display based on data stored in memory 630 or based on operations executed by processor 610 or both. In one example, graphics interface 640 generates a display based on data stored in memory 630 or based on operations executed by processor 610 or both.

Accelerators 642 can be a programmable or fixed function offload engine that can be accessed or used by a processor 610. For example, an accelerator among accelerators 642 can provide compression (DC) capability, cryptography services such as public key encryption (PKE), cipher, hash/ authentication capabilities, decryption, or other capabilities or services. In some examples, in addition or alternatively, an accelerator among accelerators 642 provides field select controller capabilities as described herein. In some cases, accelerators 642 can be integrated into a CPU socket (e.g., a connector to a motherboard or circuit board that includes a CPU and provides an electrical interface with the CPU). For example, accelerators 642 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 642 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 620 represents the main memory of system 600 and provides storage for code to be executed by processor 610, or data values to be used in executing a routine. Memory subsystem 620 can include one or more memory devices 630 such as read-only memory (ROM), flash memory, one or more varieties of random access memory (RAM) such as DRAM, or other memory devices, or a combination of such devices. Memory 630 stores and hosts, among other things, operating system (OS) 632 to provide a software platform for execution of instructions in system 600. Additionally, applications 634 can execute on the software platform of OS 632 from memory 630. Applications 634 represent programs that have their own operational logic to perform execution of one or more functions. Processes 636 represent agents or routines that provide auxiliary functions to OS 632 or one or more applications 634 or a combination. OS 632, applications 634, and processes 636 provide software logic to provide functions for system 600. In one example, memory subsystem 620 includes memory controller 622, which is a memory controller to generate and issue commands to memory 630. It will be understood that memory controller 622 could be a physical part of processor 610 or a physical part of interface 612. For example, memory controller 622 can be an integrated memory controller, integrated onto a circuit with processor 610.

In some examples, memory subsystem 620 can include circuitry to detect and reduce address translation evictions by malicious or a function or host that excessively requests address translation evictions, address translation stores, or address translation reads, as described herein.

In some examples, OS 632 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Broadcom®, Nvidia®, Texas Instruments®, among others. In some examples, a driver can advertise capability of packet processing device 650 and/or enable packet processing device 650 to transmit a packet with network resource consumption data to a sender, request network resource consumption data, and/or modify transmission of packets based on received network resource consumption data, as described herein.

While not specifically illustrated, it will be understood that system 600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 600 includes interface 614, which can be coupled to interface 612. In one example, interface 614 represents an interface circuit, which can include standalone components and integrated circuitry. In one example, multiple user interface components or peripheral components, or both, couple to interface 614. Packet processing device 650 provides system 600 the ability to communicate with remote devices (e.g., servers or other computing devices) over one or more networks. Packet processing device 650 can include an Ethernet adapter, wireless interconnection components, cellular network interconnection components, USB (universal serial bus), or other wired or wireless standards-based or proprietary interfaces. Packet processing device 650 can transmit data to a device that is in the same data center or rack or a remote device, which can include sending data stored in memory. Packet processing device 650 can receive data from a remote device, which can include storing received data into memory.

Some examples of packet processing device 650 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a packet processing device with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Processor 610 and packet processing device 650 can offload, to a switch, determination of nodes to execute microservices of a service mesh and select a memory pool or device to store data and state associated with or generated by microservices of the service mesh. In one example, system 600 includes one or more input/output (I/O) interface (s) 660. I/O interface 660 can include one or more interface components through which a user interacts with system 600 (e.g., audio, alphanumeric, tactile/touch, or other interfacing). Peripheral interface 670 can include any hardware interface not specifically mentioned above. Peripherals refer generally to devices that connect dependently to system 600. A dependent connection is one where system 600 provides the software platform or hardware platform or both on which operation executes, and with which a user interacts.

In one example, system 600 includes storage subsystem 680 to store data in a nonvolatile manner. In one example, in certain system implementations, at least certain components of storage 680 can overlap with components of memory subsystem 620. Storage subsystem 680 includes storage device(s) 684, which can be or include any conventional medium for storing large amounts of data in a non-volatile manner, such as one or more magnetic, solid state, or optical based disks, or a combination. Storage 684 holds code or instructions and data 686 in a persistent state (e.g., the value is retained despite interruption of power to system 600). Storage 684 can be generically considered to be a "memory," although memory 630 is typically the executing or operating memory to provide instructions to processor 610. Whereas storage 684 is nonvolatile, memory 630 can include volatile memory (e.g., the value or state of the data is indeterminate if power is interrupted to system 600). In one example, storage subsystem 680 includes controller 682 to interface with storage 684. In one example controller 682 is a physical part of interface 614 or processor 610 or can include circuits or logic in both processor 610 and interface 614.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). Another example of volatile memory includes cache or static random access memory (SRAM). A memory subsystem as described herein may be compatible with a number of memory technologies, such as standards released by JEDEC (Joint Electronic Device Engineering Council) on Jun. 27, 2007).

A non-volatile memory (NVM) device is a memory whose state is determinate even if power is interrupted to the device. In some examples, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), or other memory.

A power source (not depicted) provides power to the components of system 600. More specifically, power source typically interfaces to one or multiple power supplies in system 600 to provide power to the components of system 600. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 600 can be implemented using interconnected compute sleds of processors, memories, storages, packet processing devices, and other components. High speed interconnects can be used such as PCIe, Ethernet, or optical interconnects (or a combination thereof).

Examples herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, packet processing device and other examples described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Figure 7:
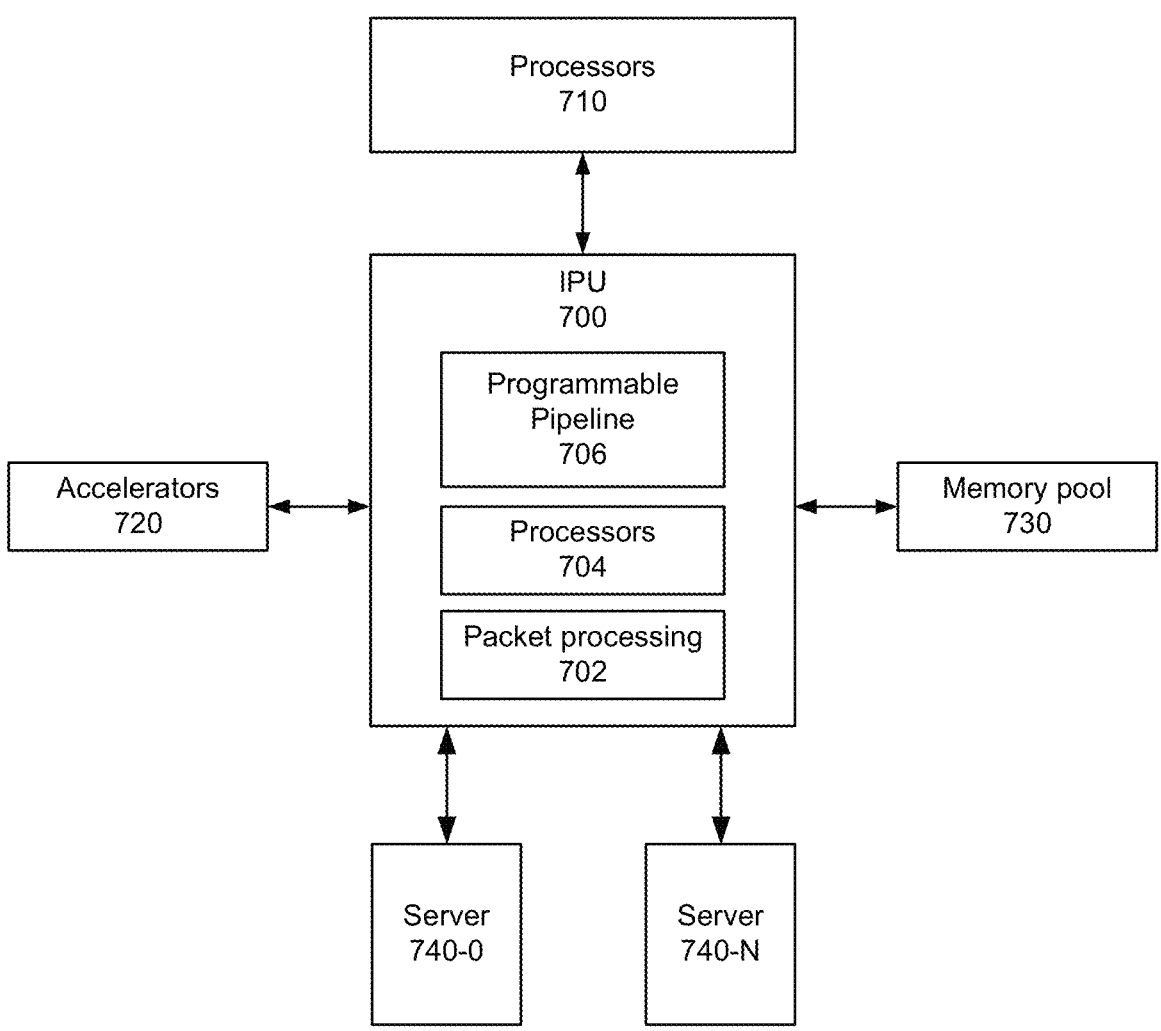
FIG. 7 depicts an example system.

FIG. 7 depicts an example system. In this system, IPU 700 manages performance of one or more processes using one or more of processors 710, accelerators 720, memory pool 730, or servers 740-0 to 740-N, where N is an integer of 1 or more. In some examples, processors 704 of IPU 700 can execute one or more processes, applications, VMs, containers, microservices, and so forth that request performance of workloads by one or more of: processors 710, accelerators 720, memory pool 730, and/or servers 740-0 to 740-N. IPU 700 can utilize packet processing device 702 or one or more device interfaces to communicate with processors 710, accelerators 720, memory pool 730, and/or servers 740-0 to 740-N. IPU 700 can utilize programmable pipeline 706 to process packets that are to be transmitted from packet processing device 702 or packets received from packet processing device 702. In some examples, IPU 700 can include circuitry to detect and reduce address translation evictions by malicious or a function or host that excessively requests address translation evictions, address translation stores, or address translation reads, as described herein.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in examples.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative examples. Furthermore, additional operations may be added or removed depending on the particular applications. Any combination of changes can be used and one of ordinary skill in the art with the benefit of this disclosure would understand the many variations, modifications, and alternative examples thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An example of the devices, systems, and methods may include any one or more, and any combination of, the examples described below.

Example 1 includes one or more examples, and includes an apparatus comprising: circuitry to permit evictions of entries from a Translation Lookaside Buffer (TLB) by one or more functions or hosts and limit evictions of entries from the TLB by one or more other functions or hosts.

Example 2 includes one or more examples, wherein the limit evictions of entries from the TLB by one or more other functions or hosts is based on a number of TLB entry evictions from the TLB over an amount of time.

Example 3 includes one or more examples, wherein the limit evictions of entries from the TLB by one or more other functions or hosts comprises reduce a number of indices available to the one or more functions or hosts.

Example 4 includes one or more examples, wherein the limit evictions of entries from the TLB by one or more other functions or hosts comprises reduce a number of indices available to the one or more functions or hosts until one or zero indices are available to the one or more functions or hosts.

Example 5 includes one or more examples, wherein the circuitry is to increase a number of evictions permitted by the one or more functions or hosts based on a number of TLB entry evictions from the TLB over an amount of time.

Example 6 includes one or more examples, wherein at least one function of the one or more other functions or hosts is associated with a Peripheral Component Interconnect express (PCIe) function identifier.

Example 7 includes one or more examples, comprising a memory management unit (MMU) that includes the circuitry.

Example 8 includes one or more examples, comprising one or more devices communicatively coupled to the MMU, wherein the one or more devices comprise one or more of: a network interface device, storage device, memory pool, accelerator, graphics processing units, or audio or sound processors.

Example 9 includes one or more examples, comprising one or more hosts communicatively coupled to a device wherein at least one of the one or more hosts comprises the TLB.

Example 10 includes one or more examples, and includes at least one non-transitory computer-readable medium, comprising instructions stored thereon, that if executed by at least one processor, cause the at least one processor to: permit evictions of entries from a Translation Lookaside Buffer (TLB) by one or more functions or hosts and limit evictions of entries from the TLB by one or more other functions or hosts.

Example 11 includes one or more examples, wherein the limit evictions of entries from the TLB by one or more other functions or hosts is based on a number of TLB entry evictions from the TLB over an amount of time.

Example 12 includes one or more examples, wherein the limit evictions of entries from the TLB by one or more other functions or hosts comprises reduce a number of indices available to the one or more functions or hosts.

Example 13 includes one or more examples, wherein the limit evictions of entries from the TLB by one or more other functions or hosts comprises reduce a number of indices available to the one or more functions or hosts until one or zero indices are available to the one or more functions or hosts.

Example 14 includes one or more examples, comprising instructions stored thereon, that if executed by at least one processor, cause the at least one processor to: increase a number of evictions permitted by the one or more functions or hosts based on a number of TLB entry evictions from the TLB over an amount of time.

Example 15 includes one or more examples, wherein at least one function of the one or more other functions or hosts is associated with a Peripheral Component Interconnect express (PCIe) function identifier.

Example 16 includes one or more examples, and includes a method comprising: permitting evictions of entries from a Translation Lookaside Buffer (TLB) by one or more functions or hosts and limiting evictions of entries from the TLB by one or more other functions or hosts.

Example 17 includes one or more examples, wherein the limiting evictions of entries from the TLB by one or more other functions or hosts is based on a number of TLB entry evictions from the TLB over an amount of time.

Example 18 includes one or more examples, wherein the limiting evictions of entries from the TLB by one or more other functions or hosts comprises reduce a number of indices available to the one or more functions or hosts.

Example 19 includes one or more examples, wherein the limiting evictions of entries from the TLB by one or more other functions or hosts comprises reduce a number of indices available to the one or more functions or hosts until one or zero indices are available to the one or more functions or hosts.

Example 20 includes one or more examples, comprising: increasing a number of evictions permitted by the one or more functions or hosts based on a number of TLB entry evictions from the TLB over an amount of time.

What is claimed is:

1. An apparatus comprising:
an interface and
circuitry to:
permit evictions of entries from a Translation Lookaside Buffer (TLB) by one or more functions or hosts,
limit evictions of entries from the TLB by one or more other functions or hosts based on a number of evictions from the TLB associated with the one or more functions or hosts, and
increase a number of evictions permitted by the one or more functions or hosts based on a number of TLB entry evictions from the TLB over an amount of time.

2. The apparatus of claim 1, wherein the limit evictions of entries from the TLB by one or more other functions or hosts is based on a number of TLB entry evictions from the TLB over an amount of time.

3. The apparatus of claim 1, wherein the limit evictions of entries from the TLB by one or more other functions or hosts comprises reduce a number of indices available to the one or more functions or hosts.

4. The apparatus of claim 1, wherein the limit evictions of entries from the TLB by one or more other functions or hosts comprises reduce a number of indices available to the one or more functions or hosts until one or zero indices are available to the one or more functions or hosts.

5. The apparatus of claim 1, wherein at least one function of the one or more other functions or hosts is associated with a Peripheral Component Interconnect express (PCIe) function identifier.

6. The apparatus of claim 1, comprising a memory management unit (MMU) that includes the circuitry.

7. The apparatus of claim 6, comprising one or more devices communicatively coupled to the MMU, wherein the one or more devices comprise one or more of: a network interface device, storage device, memory pool, accelerator, graphics processing units, or audio or sound processors.

8. The apparatus of claim 1, comprising one or more hosts communicatively coupled to a device wherein at least one of the one or more hosts comprises the TLB.

9. At least one non-transitory computer-readable medium, comprising instructions stored thereon, that if executed by at least one processor, cause the at least one processor to:
permit evictions of entries from a Translation Lookaside Buffer (TLB) by one or more functions or hosts;

limit evictions of entries from the TLB by one or more other functions or hosts based on a number of evictions from the TLB associated with the one or more functions or hosts; and increase a number of evictions permitted by the one or more functions or hosts based on a number of TLB entry evictions from the TLB over an amount of time.

10. The at least one computer-readable medium of claim 9, wherein the limit evictions of entries from the TLB by one or more other functions or hosts is based on a number of TLB entry evictions from the TLB over an amount of time.

11. The at least one computer-readable medium of claim 9, wherein the limit evictions of entries from the TLB by one or more other functions or hosts comprises reduce a number of indices available to the one or more functions or hosts.

12. The at least one computer-readable medium of claim 9, wherein the limit evictions of entries from the TLB by one or more other functions or hosts comprises reduce a number of indices available to the one or more functions or hosts until one or zero indices are available to the one or more functions or hosts.

13. The at least one computer-readable medium of claim 9, wherein at least one function of the one or more other functions or hosts is associated with a Peripheral Component Interconnect express (PCIe) function identifier.

14. A method comprising:

permitting evictions of entries from a Translation Lookaside Buffer (TLB) by one or more functions or hosts;

limiting evictions of entries from the TLB by one or more other functions or hosts based on a number of evictions from the TLB associated with the one or more functions or hosts; and increasing a number of evictions permitted by the one or more functions or hosts based on a number of TLB entry evictions from the TLB over an amount of time.

15. The method of claim 14, wherein the limiting evictions of entries from the TLB by one or more other functions or hosts is based on a number of TLB entry evictions from the TLB over an amount of time.

16. The method of claim 14, wherein the limiting evictions of entries from the TLB by one or more other functions or hosts comprises reduce a number of indices available to the one or more functions or hosts.

17. The method of claim 14, wherein the limiting evictions of entries from the TLB by one or more other functions or hosts comprises reduce a number of indices available to the one or more functions or hosts until one or zero indices are available to the one or more functions or hosts.

* * * * *